United States Patent
Linzer

(10) Patent No.: US 10,462,368 B1
(45) Date of Patent: Oct. 29, 2019

(54) TEMPORAL FILTERING BASED ON MOTION DETECTION BETWEEN TEMPORALLY NON-ADJACENT PICTURES

(71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 16/012,048

(22) Filed: Jun. 19, 2018

Related U.S. Application Data

(63) Continuation of application No. 14/699,310, filed on Apr. 29, 2015, now Pat. No. 10,021,304.

(60) Provisional application No. 62/097,663, filed on Dec. 30, 2014.

(51) Int. Cl.
  H04N 5/232   (2006.01)
  G06T 7/223   (2017.01)
  G06T 7/215   (2017.01)

(52) U.S. Cl.
  CPC ......... H04N 5/23254 (2013.01); G06T 7/215 (2017.01); G06T 7/223 (2017.01); H04N 5/23277 (2013.01); H04N 5/23258 (2013.01)

(58) Field of Classification Search
  CPC .... H04N 5/144; H04N 5/145; H04N 5/23251; H04N 5/23254; H04N 5/23267; H04N 5/23277; G06T 7/223; G06T 3/0068; G06T 7/215
  See application file for complete search history.

(56) References Cited

U.S. PATENT DOCUMENTS

| | | | | |
|---|---|---|---|---|
| 6,178,205 | B1 | 1/2001 | Cheung et al. | 375/240.29 |
| 7,639,741 | B1 | 12/2009 | Holt et al. | 375/240.08 |
| 8,164,636 | B1 | 4/2012 | Linzer | 348/208.12 |
| 9,215,355 | B2* | 12/2015 | Chen | G06T 5/002 |
| 2007/0014368 | A1* | 1/2007 | MacInnis | H04N 5/21 375/240.24 |
| 2007/0071342 | A1* | 3/2007 | Bilbrey | G06T 5/20 382/254 |
| 2007/0195199 | A1* | 8/2007 | Chen | H04N 5/144 348/607 |
| 2009/0185721 | A1* | 7/2009 | Hiraga | G06T 5/50 382/107 |
| 2009/0232216 | A1 | 9/2009 | Kurata | 375/240.16 |
| 2010/0254572 | A1 | 10/2010 | Tener et al. | 382/103 |
| 2011/0090960 | A1* | 4/2011 | Leontaris | H04N 19/103 375/240.12 |
| 2011/0242422 | A1* | 10/2011 | Hong | H04N 5/2176 348/614 |
| 2016/0037061 | A1* | 2/2016 | Lim | H04N 5/23229 348/241 |

* cited by examiner

*Primary Examiner* — Twyler L Haskins
*Assistant Examiner* — Akshay Trehan
(74) *Attorney, Agent, or Firm* — Christopher P. Maiorana, PC

(57) ABSTRACT

A method for temporal filtering based on motion detection between non-adjacent pictures. The method may compute a motion score by motion detection between a target area in a target picture and a first area in a non-adjacent one of a plurality of reference pictures; and temporal filter the target area with a second area in an adjacent one of the reference pictures based on the motion score to generate a filtered area in a filtered picture. At least one of (i) the motion score and (ii) the generation of the filtered area may be controlled by one or more gain settings in a circuit.

20 Claims, 5 Drawing Sheets

TEMPORAL FILTERING BASED ON MOTION DETECTION BETWEEN TEMPORALLY NON-ADJACENT PICTURES

This application relates to U.S. Ser. No. 14/699,310, filed Apr. 29, 2015, which relates to U.S. Provisional Application No. 62/097,663, filed Dec. 30, 2014, each of which are hereby incorporated by reference in their entirety.

FIELD OF THE INVENTION

The present invention relates to video temporal filtering with motion detection generally and, more particularly, to methods and/or apparatus for temporal filtering based on motion detection between non-adjacent pictures.

BACKGROUND OF THE INVENTION

Conventional motion detection looks at a local error measure, commonly a sum-of-absolute-differences, between a target picture and a reference picture. Even if no motion exists, such local error measures tend to be non-zero due to noise and changes in scene lightness. Therefore, motion detection commonly detects small differences between the pictures as no motion and detects big differences as motion. Temporal filtering is used to combine a target picture with a motion compensated reference picture, and uses strong filtering where no motion is detected.

It would be desirable to implement temporal filtering based on motion detection between non-adjacent pictures.

SUMMARY OF THE INVENTION

The present invention concerns a method for temporal filtering based on motion detection between non-adjacent pictures. The method may compute a motion score by motion detection between a target area in a target picture and a first area in a non-adjacent one of a plurality of reference pictures; and temporal filter the target area with a second area in an adjacent one of the reference pictures based on the motion score to generate a filtered area in a filtered picture. At least one of (i) the motion score and (ii) the generation of the filtered area may be controlled by one or more gain settings in a circuit.

The objects, features and advantages of the present invention include providing temporal filtering based on motion detection between non-adjacent pictures that may (i) use motion detection between two different pairs of pictures to determine how to apply a temporal filter between a pair of the pictures, (ii) use a motion detection that covers a wide area and another motion detection that covers a small area to determine how to apply a temporal filter between the pair of the pictures, (iii) combine multiple motion detection scores to control the temporal filter and/or (iv) use motion detection between non-adjacent pictures to determine how to temporal filter between adjacent pictures.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Motion detection may be used in many applications, such as security cameras, and/or in many operations, such as motion compensated temporal filtering (e.g., MCTF) a sequence of pictures (or images). For the motion compensated temporal filtering, a filter may adaptively combine one or more reference (or previous) pictures and a target (or current) picture of the sequence based on detected motion in the target picture relative to the reference pictures. The filtering may also decide locally how to combine the multiple pictures (e.g., fields and/or frames) to reduce noise while limiting filter-created artifacts.

Typically, the filter may favor a reference picture more the more the filter determines that no motion exists in a local area relative to the reference picture. For such a filter, motion may mean motion in an absolute sense, if motion exists. In various embodiments, the reference pictures may be pre-transformed per a motion model (e.g., a process used to estimate motion between the pictures). The transformed (motion compensated) reference pictures may be subsequently combined with the target picture. For a motion compensated temporal filtering case, motion generally means motion between the motion compensated reference pictures and the target picture. For a non-motion compensated temporal filtering case, motion generally means motion between the non-compensated reference pictures and the target picture.

Figure 1:
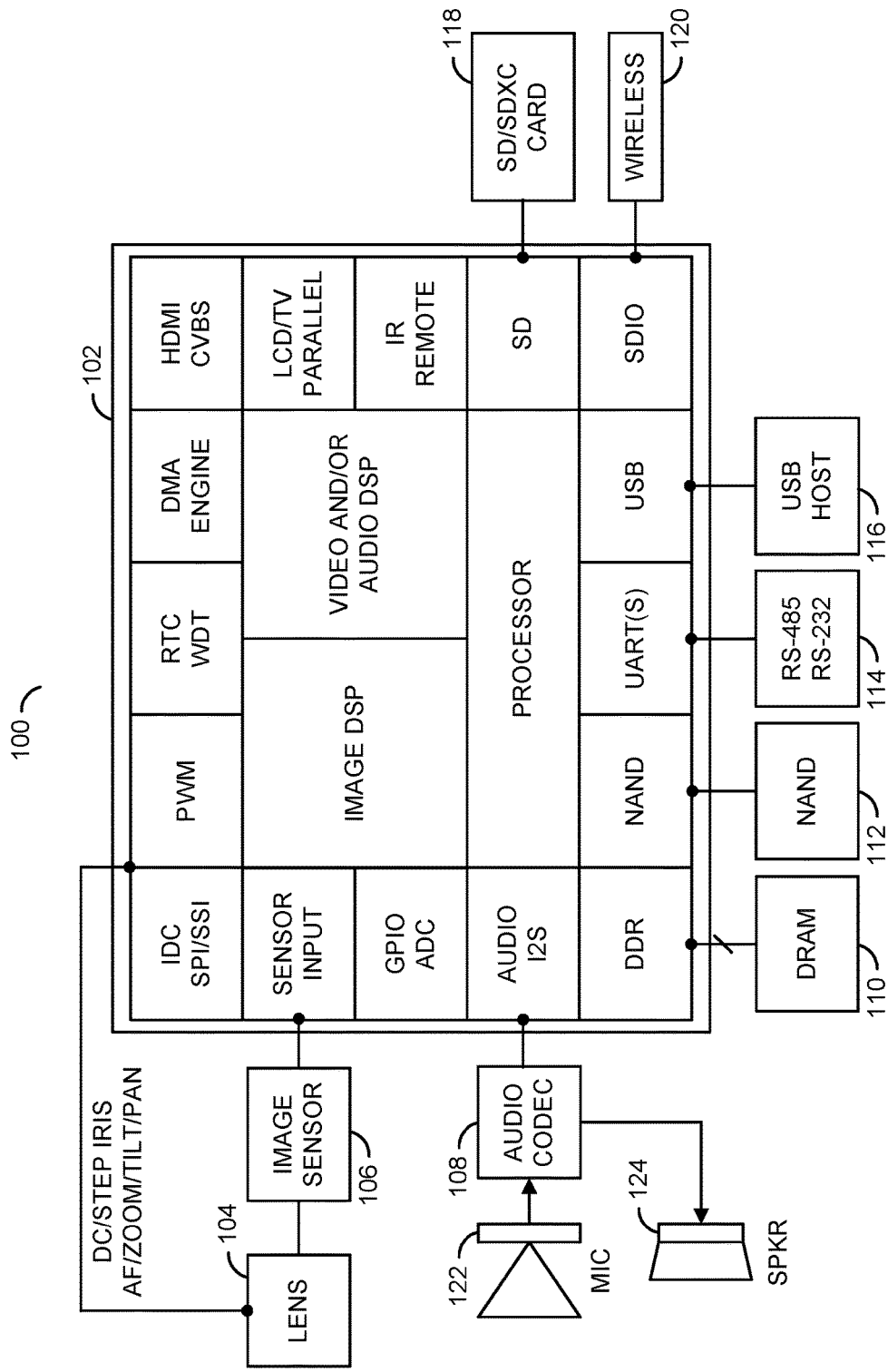
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, non-volatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing a temporal filter with noise-robust and/or slow-motion robust motion detection may be stored in one or more of the memories 110 and 112. When executed by the circuit 102, the programming code generally causes the circuit 102 to receive a sequence of pictures from the sensor 106, temporal filter based on measurements if an area is stationary for several pictures, temporal filter based on motion detection on small and big areas, temporal filter based on comparing down-sampled pictures, and/or temporal filter adjacent pictures based on motion detection of non-adjacent pictures.

For noisy image sequences, the differences between pictures, even in stationary areas, may be large since the noise in each picture is different. Moreover, slow motion tends to add only small amounts to motion scores. Therefore, conventional motion detection may fail to correctly detect slow motion and/or motion in noisy sequences of pictures. False positives (e.g., detecting motion where none exists) may result in too-noisy output pictures. False negatives (e.g., not detecting actual motion) may result in temporal artifacts. Various embodiments of the present invention generally contain one or more of the following features that may be used individually or in combination to make temporal filtering based on motion compensation more robust.

Temporal filtering of adjacent pictures (or frames or fields) may be based on motion detection of non-adjacent pictures. Adjacent pictures may be combined with a temporal filtering technique because adjacent pictures are generally more similar to each other than non-adjacent pictures. For slow motion, the non-adjacent pictures may exhibit greater motion and, therefore, may exhibit higher motion scores than adjacent pictures. Performing motion detection on non-adjacent pictures (e.g., a target picture and a non-adjacent reference picture) may provide a more robust detection of slow motion, especially in the presence of noise.

Motion detection may be based on observing if the video is stationary or moving for several pictures. Specifically, for the same location, scores are generally used from multiple picture comparisons. By incorporating extra data into the still or moving decision, the detection may be more robust.

Figure 2:
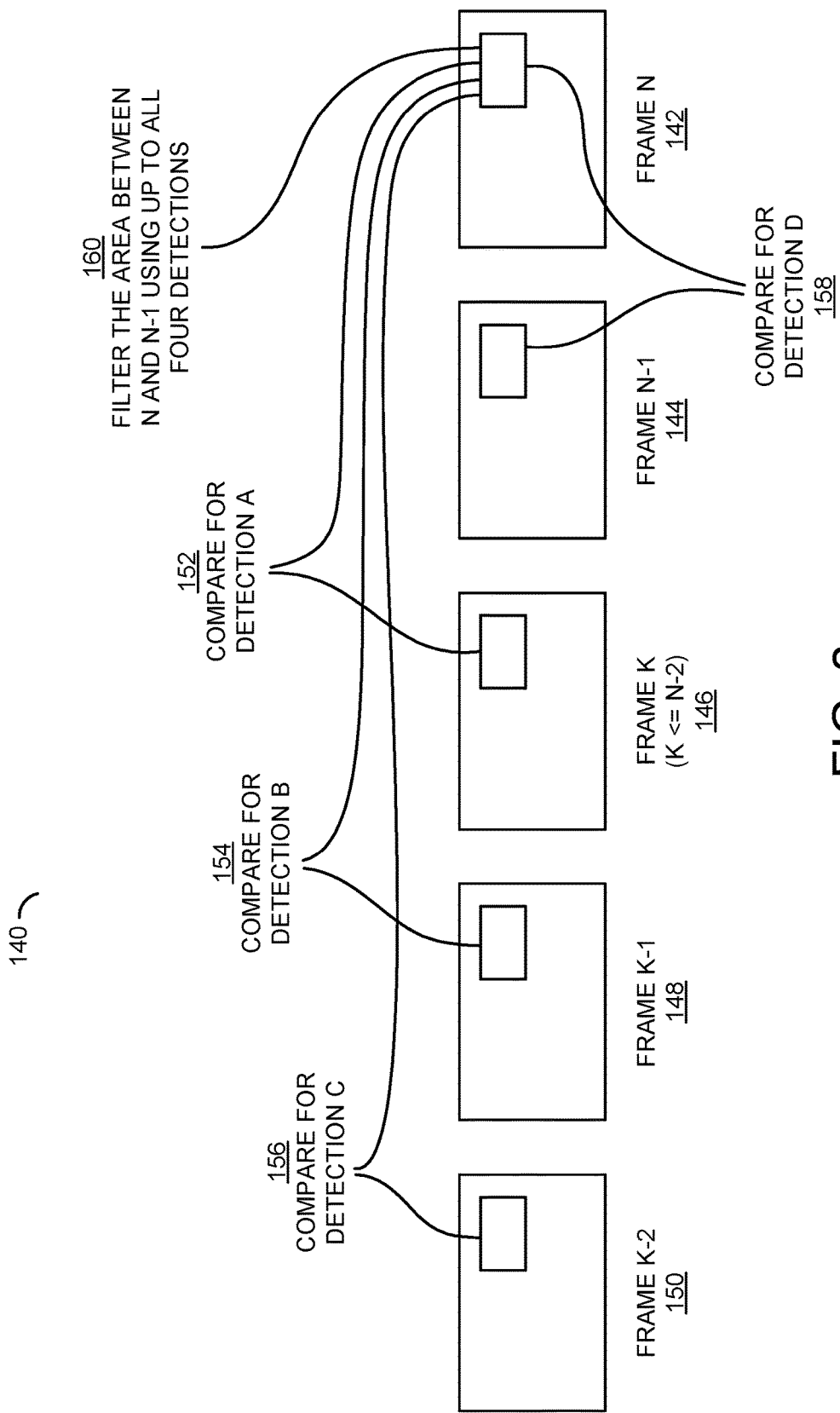
FIG. 2 is a graphical representation of several motion detections.

Referring to FIG. 2, a graphical representation 140 of several motion detections is shown. Consider a sequence of several frames N to K−2 (e.g., reference numbers 142 to 150). A motion detection 152 generally detects motion of an area between a target frame N (142) and a spatially co-located area in a non-adjacent reference frame K (146). The reference frame K (146) may be non-adjacent to the target frame N (142). In the example illustrated, the reference frame K (146) may be at least two frames earlier (e.g., K≤N−2) than the target frame N (142). Another motion detection may be used to check for motion over a longer time (e.g., over more frames). A motion detection 154 generally detects motion between the target frame N (142) and a reference frame K−1 (148). Still another motion detection 156 may detect motion between the target frame N (142) and a reference frame K−2 (150). In various embodiments, an additional motion detection 158 may be performed between the target picture N (142) and an adjacent reference picture N−1 (144). Up to all of the detections 152, 154, 156 and 158 may be used to filter (160) samples between an area in the target frame N (142) and the area in the adjoining reference frame N−1 (144). Additional details for combining motion detections may be described in co-pending U.S. patent application Ser. No. 14/636,618, filed Mar. 3, 2015, which is hereby incorporated by reference in its entirety.

While the example illustrates three non-adjacent motion detections (e.g., the detections 152, 154 and 156), any one or more of the non-adjacent detections may be used. The area may range from a single pixel to many pixels (e.g., 4×4, 8×8, 16×16, 32×32, or 64×64 blocks of pixels). In various embodiments, multiple different sizes and/or shapes of the areas may be used in the motion detection. Additional details regarding motion detection using different sized areas may be described in co-pending U.S. patent application Ser. No. 14/667,950, filed Mar. 25, 2015, which is hereby incorporated by reference in its entirety.

In some embodiments, the motion detections may be performed between full-resolution frames N to K−2 (142-150) and reduced-resolution frames using the different sizes and/or shapes of the areas. Computational costs and resource consumption may be reduced by computing some motion scores using scaled-down pictures. Computing a motion score for a given area generally involves processing more samples in the full-resolution pictures than a proportionally smaller number of samples in the scaled-down pictures. Additional details regarding motion detection using full-resolution pictures and reduced-resolution pictures may be described in co-pending U.S. patent application Ser. No. 14/688,071, filed Apr. 16, 2015, which is hereby incorporated by reference in its entirety.

Figure 3:
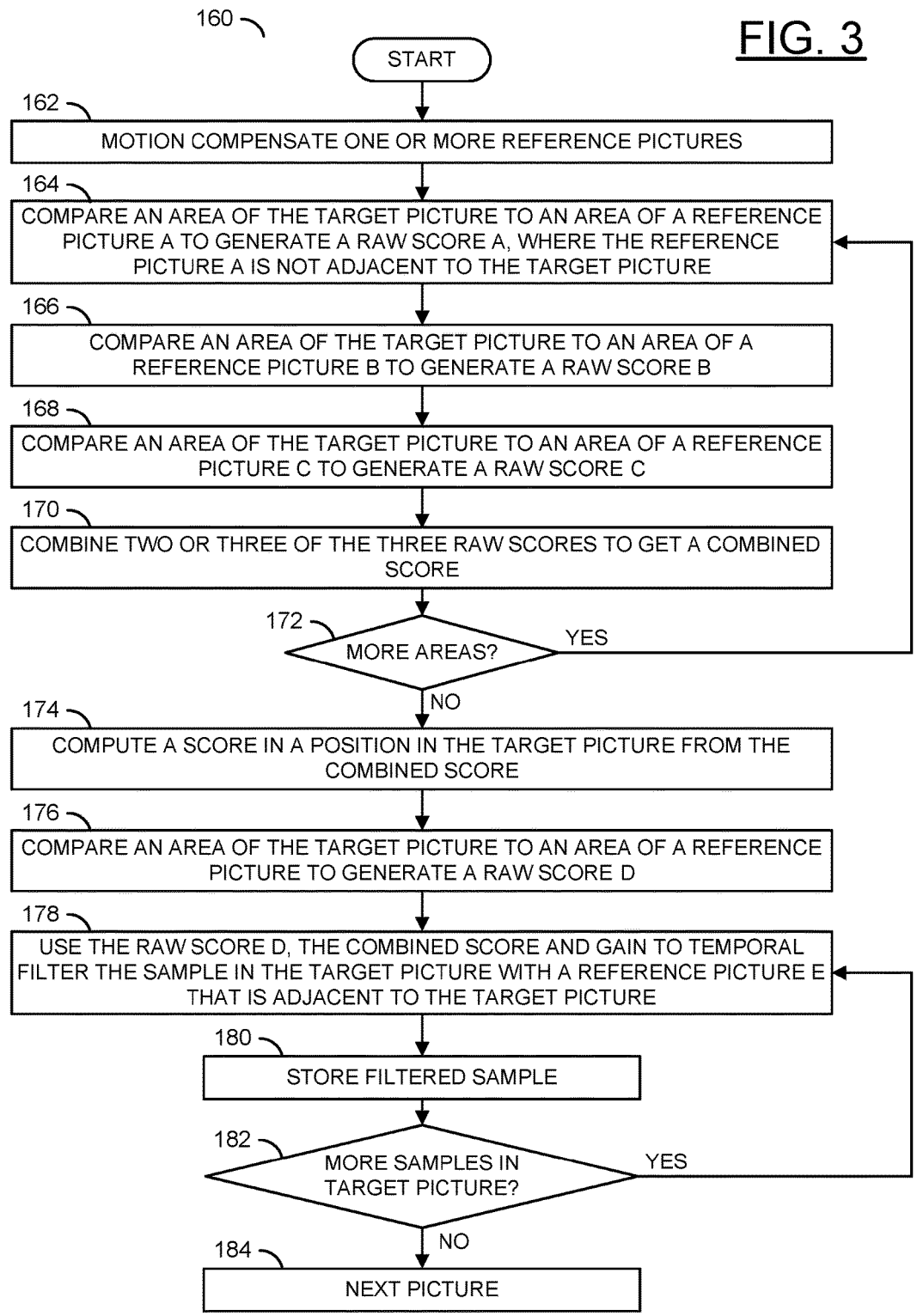
FIG. 3 is a flow diagram of a motion detection method in accordance with a preferred embodiment of the present invention.

Referring to FIG. 3, a flow diagram of a motion detection method 160 is shown in accordance with a preferred embodiment of the present invention. The method (or process) 160 may be performed by the circuit 102. The method 160 generally comprises a step (or state) 162, a step (or state) 164, a step (or state) 166, a step (or state) 168, a step (or state) 170, a decision step (or state) 172, a step (or state) 174, a step (or state) 176, a step (or state) 178, a step (or state) 180, a decision step (or state) 182 and a step (or state) 184. The steps 162-184 may be implemented in hardware, software, firmware or any combination thereof in an apparatus (or circuit or device). The sequence of the steps is shown as a representative example. Other step orders may be implemented to meet the criteria of a particular application.

In various embodiments, the circuit 102 may motion compensate one or more reference pictures (e.g., the frames N−1, N−2, N−3, etc.) in the step 162. In other embodiments, the step 162 may be eliminated and the motion detection/temporal filtering may be performed without motion compensation. The circuit 102 may compare an area of the target picture (e.g., the frame N) to a spatially co-located area of a reference picture A (e.g., the frame K) in the step 164 to generate a raw score A (e.g., a motion score). In some embodiments, the reference picture A may not be temporally adjacent to the target picture N (e.g., the reference picture A may be the frame N−2). In the step 166, the area of the reference picture A may be compared with the spatially co-located area of another reference picture B (e.g., the frame K−1) to generate another raw score B (e.g., an additional motion score). The area of the reference picture B may be compared in the step 168 to the spatially co-located area of a reference picture C (e.g., the frame K−2) to generate a raw score C (e.g., another motion score). The circuit 102 may optionally combine two or three of the three raw scores A, B and/or C in the step 170 to generate a combined score. The decision step 172 generally determines if additional detections may be useful in one or more additional areas. If the additional detections may be useful, the steps 164-170 may be repeated.

After all of the raw scores and the combined motion scores have been generated, the step 174 may compute a score in each position within the target picture N from one or more neighboring scores of the combined scores.

The step 176 may compare the area in the target picture N to the area in an adjacent reference picture D to compute another (e.g., adjacent) motion score. In various embodiments, the reference picture D (e.g., the frame N−1 or N+1) may be temporally adjacent to the target picture N. In the step 178, the circuit 102 may use the adjacent motion score, the combined motion score (or a single raw motion score) and a gain value, applied by the circuits 102 and/or 106, to temporal filter a target sample in the area of the target picture N (e.g., the frame 142) with an adjacent reference picture E (e.g., the frame 144). The reference picture E (e.g., the frame N−1 or N+1) may be temporally adjacent to the target picture N. In some embodiments, the reference picture E may be the same as the reference picture D. In the step 180, the filtered target sample may be stored in one or more of the memories (e.g., the memory 110).

A check may be performed in the decision step 182 to determine if any more target samples exist in the current target picture N. If more target samples have yet to be processed, the method 160 may move to the next unprocessed target sample and return to the temporal filter process (e.g., the step 178). Once all of the target samples in the current target picture N have been processed, the method 160 may continue in the step 184 with the target samples in the next picture.

The gain settings in the camera system 100 may include an analog gain and/or a digital gain in the image sensor 106, and/or a digital gain in the circuit 102. One or more of the settings may be considered in the temporal filtering. Furthermore, offset settings, exposure settings and/or aperture settings may also be considered in the temporal filtering. The circuit 102 generally controls the lens assembly 104 and/or the image sensor 106 for an automatic exposure operation. Changes in the automatic exposure may change the light levels in the image data received from the sensor 106. The gain settings affect the noise in pictures; therefore, any of the steps computing the various scores (e.g., the steps 164, 166, 168 and/or 176), combining the scores (e.g., the step 170), and/or using the scores for temporal filtering (e.g., the step 178) may be controlled based on the gain settings, offset settings, exposure settings and/or aperture settings.

The scores computed in the steps 164, 166, 168 and/or 176 may be any score that is generally higher when motion exists between pictures. The scores may include, but are not limited to, sum-of-absolute-differences and sum-of-squared-differences. The scores may further be modified based on tone (e.g., brightness and/or color) as described in co-pending U.S. patent application Ser. No. 14/580,867, filed Dec. 23, 2014, which is hereby incorporated by reference in its entirety.

Figure 4:
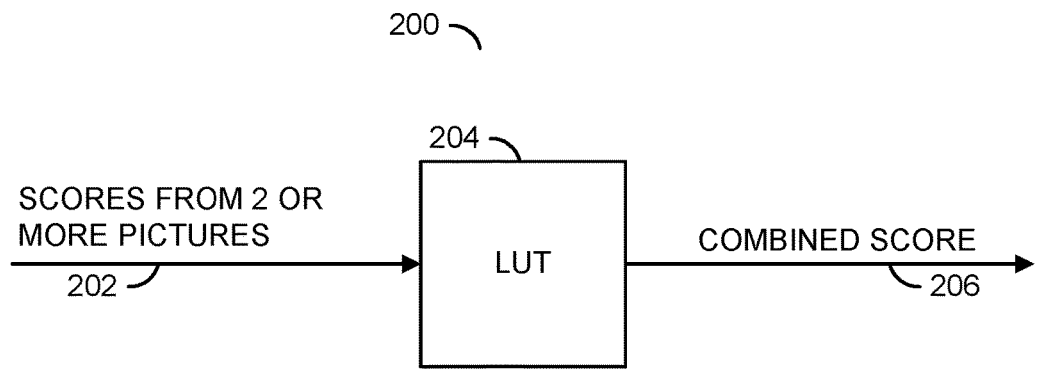
FIG. 4 is a diagram of an example score combination by lookup.
Figure 5:
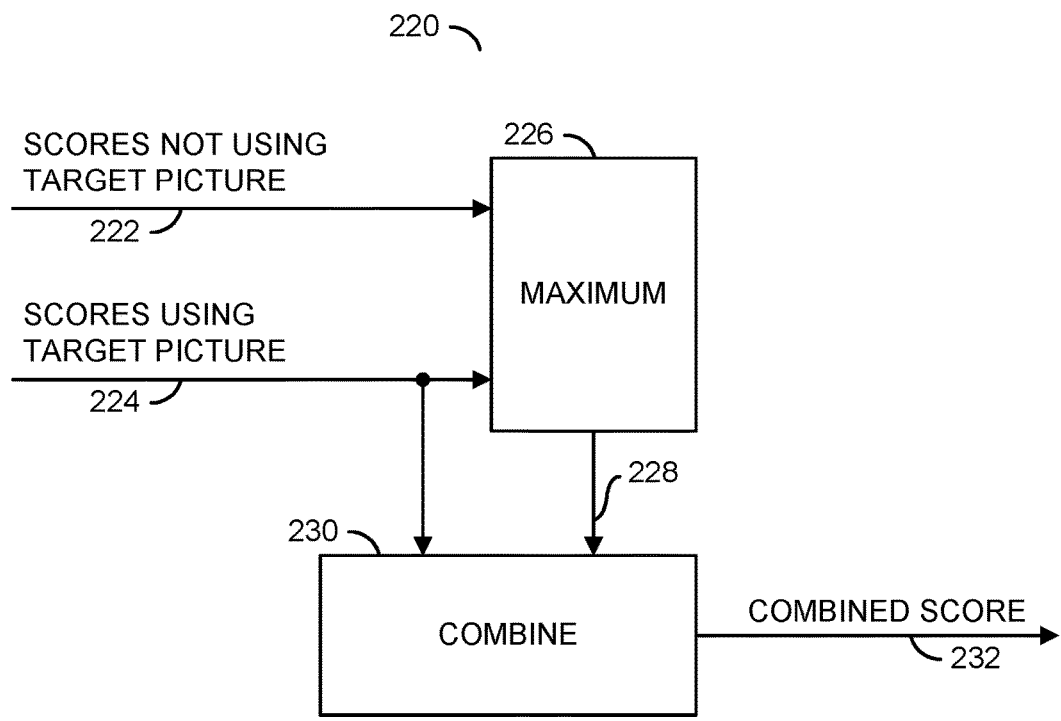
FIG. 5 is a diagram of an example score combination using maximum and two-dimensional combining.

The steps 164-168 generally show three picture comparisons. In general, more or fewer picture comparisons may be implemented to meet the criteria of a particular application. The combining operations may use lookup tables and/or mathematical transformations to generate the combined motion scores. The step 170 generally shows combining two or more scores from different pictures. FIGS. 4 and 5 may illustrate embodiments of various combination operations. Other comparisons between the target frame N (142) and the reference frames may be implemented.

Referring to FIG. 4, a diagram of an example score combination 200 by lookup table is shown. A signal 202 may carry the non-adjacent motion scores from two or more frames to a multi-dimensional lookup table (e.g., LUT) 204. An entry (or value) stored in the LUT 204 at an index formed by the non-adjacent motion scores may be presented from the LUT 204 as the combined score in a signal 206.

Referring to FIG. 5, a diagram of an example score combination circuit (or module) 220 using maximum selection and two-dimensional combining is shown. The scores that do not use the target frame N (e.g., motion detection between a picture N+1 and a picture N−3) may be received via a signal 222 by a maximum circuit (or module) 226. The scores that use the target frame N may be received by the maximum circuit 226 and a combine circuit (or module) 230 via a signal 224. The circuit 226 is generally operational to select a maximum score (or value) among the received scores. The maximum score may be passed in a signal 228 to the circuit 230. The circuit 230 is generally operational to perform a two-dimensional lookup or mathematical operations on the scores received in the signals 224 and 228 to generate and present a combined score in a signal 232.

Various embodiments of the circuit 230 may implement a two-dimensional (e.g., a dimension for the signal 224 and another dimension for the signal 228) lookup. Other embodiments of the circuit 230 generally select the highest score in the signal 228. Some embodiments of the circuit 230 may transform the maximum score per formula 1 as follows:

$$\text{Combined\_score} = ((\text{Max\_score} - \text{SUB}) \times \text{MUL}) \qquad (1)$$

Where a subtraction value SUB and a multiplication value MUL may be controllable parameters, and where a value Max_score may be the maximum score in the signal 228. Still other embodiments may transform the maximum score with the score in the signal 224 as follows:

If(Max_score<THR) Combined_score=0;
  else {
    A=(CUR−SUB)×MUL
    Combined_score=max(Min_score, A)
  }

Where a threshold THR, a minimum score Min_score, the subtraction value SUB and the multiplication value MUL may be controllable parameters. A current value CUR may be the score that uses the target picture N in the signal 224. The temporal filtering may combine the target picture N and a reference picture using a blending curve.

Figure 6:
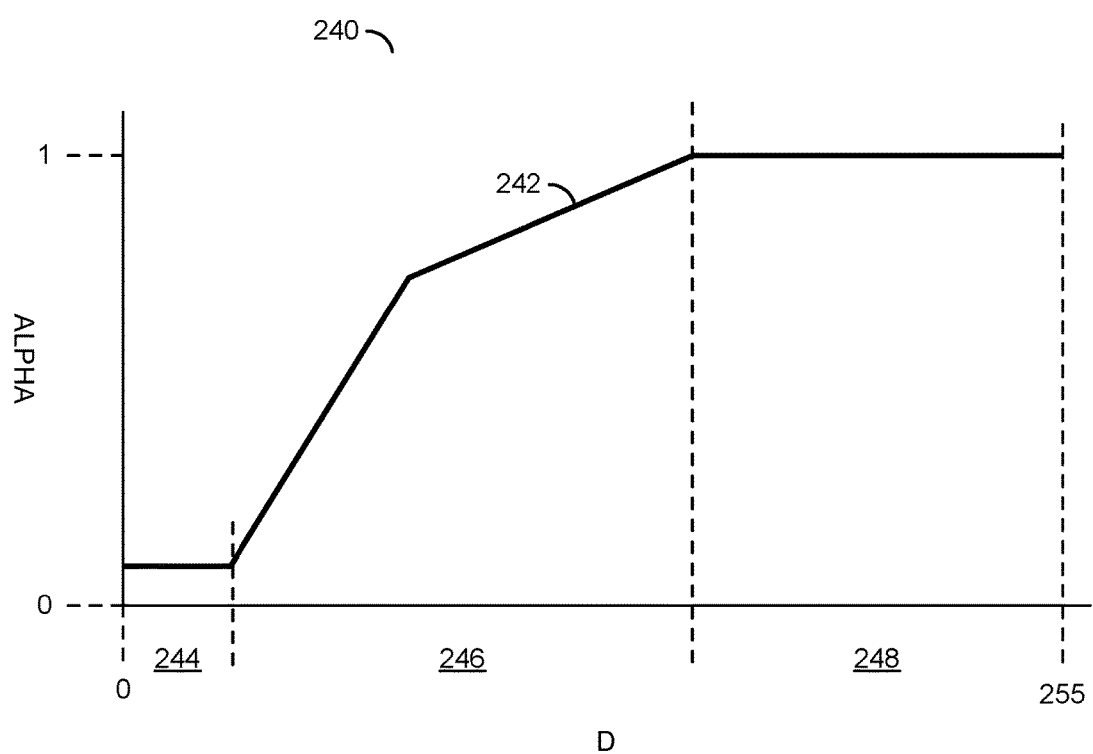
FIG. 6 is a diagram of a blending curve.

Referring to FIG. 6, a diagram 240 of an example blending curve 242 is shown. A strength of the temporal filtering (or blending) may be a continuum for one or more filter strengths. The diagram 240 generally illustrates a range of medium filter strengths and fixed filter strengths. A degree of filtering may depend on the blending curve 242.

An example of blending is generally determined as follows:

T=target (current) sample;
R=reference (previous) sample;
D=detected motion score; and
Alpha (curve 242)=lookup of the value D.

A filtered result (sample) may be calculated by formula 2 as follows:

$$\text{Result} = (\text{Alpha} \times T) + ((1 - \text{Alpha}) \times R) \quad (2)$$

In the diagram 240, the X axis generally represents the detected motion value D (e.g., the adjacent motion score or the combined motion score of the target frame N). For 8-bit levels of detected motion, the X axis is generally labeled from 0 to 255. The Y axis generally represents an alpha value (or transformed motion score) and ranges from 0 (zero) to 1 (unity). Other ranges of D and alpha may be implemented to meet the criteria of a particular application. Other techniques for determining the value D may also be implemented, such as considering several target samples simultaneously.

Small detected motion values D may be illustrated in the section 244. The section 244 generally results in a low value of alpha per the blending curve 242. Medium (or intermediate) detected motion values D may be illustrated in the section 246. The section 246 generally results in a range of values for alpha per the blending curve 242. Large detected motion values of D may be illustrated in the section 248. The section 248 generally results in a high value of alpha per the blending curve 242.

Where slow or no motion is detected, the value D is small and in the section 244. Therefore, the value alpha may be small (and optionally a fixed value). Per formula 2, the small value alpha generally weights the blending to favor the adjacent reference sample, or in some cases (e.g., alpha=0.5) averages the reference sample with the target sample. Such blending may be considered a strong filtering. Where medium motion is detected, the value D may be medium and in the section 246. Thus, the value alpha may be medium. Per formula 2, the medium value alpha variably weights the blending between the target sample and the adjacent reference sample, depending on the level of motion. Such blending may be considered a medium filtering. Where fast motion is detected, the value D may be large and in the section 248. Therefore, the value alpha may be large and weights the blending to favor the target sample. Such blending is generally considered a weak filtering. Where the value alpha=1, no filtering is accomplished and the target sample is unchanged.

In various embodiments, the blending curve 242 may be implemented as one or more LUTs. For example, a single LUT (e.g., LUT 204) may store all points of the blending curve 242. The value D may be implemented as the final combined score value or the adjacent motion score value.

In other embodiments, different LUTs may store different blending curves and/or different portions of one or more blending curves. Selection of a particular LUT is generally based on a non-adjacent score (e.g., the raw score A value or the combined score value). For example, if the combined score is zero, an LUT number 0 may be utilized. If the combined score is greater than zero and less than a threshold T1, an LUT number 1 may be utilized. If the combined score is greater than the threshold T1 and less than a threshold T2, an LUT number 2 may be utilized. If the combined score is greater than the threshold T2, an LUT number 3 is generally utilized. Other numbers of LUTs may be implemented to meet the criteria of a particular application.

In some embodiments, the raw score A value or the combined score may be a lookup table number. The number of LUTs may be clamped per formula 3 as follows to a maximum value to avoid having too many LUTs:

$$\text{Table} = \min(\text{non-adjacent score}, \text{number of tables} - 1) \quad (3)$$

In various embodiments, the raw score A value or the combined score value may be used to scale the value D received by the curve 242 or the LUT 204. The scaling may be implemented per formula 4 as follows:

$$D\_\text{used} = D\_\text{before\_multiplication} \times \text{non-adjacent score} \quad (4)$$

In other embodiments, the raw score A value or the combined score value may be used to offset the value D received by the curve 242 or the LUT 204. The offsetting may be implemented per formula 5 as follows:

$$D\_\text{used} = D\_\text{before\_offset} + \text{non-adjacent score} \quad (5)$$

In various embodiments, the combined score may be used to determine the alpha curve (or table) by selecting from a number of alpha curves (or tables). In some embodiments, the selection may be performed by directly using the combined score. Directly using the combined score may be appropriate where the combined score may take on a small number of values. In other embodiments, the selection may be performed by clamping the combined score. For example, if the combined score may take on values in a range of 0-255, and three alpha tables (e.g., alpha tables 0-2) are available, the alpha table may be selected per formula 6 as follows:

$$\text{Alpha table} = \min(3, \text{combined score}) \quad (6)$$

The functions and structures illustrated in the diagrams of FIGS. 1-6 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for temporal filtering based on motion detection between non-adjacent pictures comprising the steps of:

computing a motion score by motion detection between a target area in a target picture and a temporally non-adjacent first area in a non-adjacent one of a plurality of reference pictures;

generating a temporal filter strength based on the motion score, wherein said temporal filter strength is determined based upon said motion score and a blending function that is nonlinear over a range of values of said motion score; and temporal filtering said target area with a second area in an adjacent one of said reference pictures based on said temporal filter strength to generate a filtered area in a filtered picture, wherein said target area, said first area, and said second area are spatially co-located and at least one of (i) said motion score and (ii) said generation of said filtered area is controlled by one or more gain settings in a circuit.

2. The method according to claim 1, further comprising the step of:

computing an additional motion score by motion detection between said target area and a third area in an additional one of said reference pictures, wherein said additional reference picture is non-adjacent to said target picture.

3. The method according to claim 2, further comprising the step of:

computing a combined motion score as a combination of said motion score and said additional motion score, wherein said temporal filter strength is based on said combined motion score and said blending function.

4. The method according to claim 3, wherein said combined motion score is read from a lookup table indexed by said motion score and said additional motion score.

5. The method according to claim 1, further comprising the step of:

computing an additional motion score by motion detection between said target area and said second area, wherein said generation of said filtered area is further based on said additional motion score.

6. The method according to claim 5, further comprising the step of:

computing a combined motion score as a combination of said motion score and another motion score based on a third area in another one of said reference pictures, wherein said other reference picture is non-adjacent to said target picture.

7. The method according to claim 1, further comprising the steps of:

generating a maximum motion score by selecting a maximum value between said motion score and another motion score, wherein said other motion score is independent of said target picture; and transforming said maximum motion score to generate a combined motion score, wherein said temporal filter strength is based on said combined motion score and said blending function.

8. The method according to claim 1, further comprising the steps of:

determining a maximum score among (i) said motion score and (ii) one or more additional motion scores computed between two or more co-located areas in two or more of said reference pictures; and combining said maximum score and said motion score to generate a combined motion score, wherein said temporal filter strength is based on said combined motion score and said blending function.

9. The method according to claim 1, wherein the steps are performed in a digital camera.

10. The method according to claim 1, further comprising the step of:

motion compensating said non-adjacent reference picture prior to said motion detection with said target area.

11. An apparatus comprising:

an interface configured to receive a sequence of pictures; and a circuit configured to (i) compute a motion score by motion detection between a target area in a target picture and a first area in a non-adjacent one of a plurality of reference pictures, (ii) generate a temporal filter strength based on the motion score, wherein said temporal filter strength is determined based upon said motion score and a blending function that is nonlinear over a range of values of said motion score, and (iii) temporal filter said target area with a second area in an adjacent one of said reference pictures based on said temporal filter strength to generate a filtered area in a filtered picture, wherein said target area, said first area, and said second area are spatially co-located and at least one of (i) said motion score and (ii) said generation of said filtered area is controlled by one or more gain settings.

12. The apparatus according to claim 11, wherein (i) said circuit is further configured to compute an additional motion score by motion detection between said target area and a third area in an additional one of said reference pictures and (ii) said additional reference picture is non-adjacent to said target picture.

13. The apparatus according to claim 12, wherein (i) said circuit is further configured to compute a combined motion score as a combination of said motion score and said additional motion score and (ii) said temporal filter strength is based on said combined motion score and said blending function.

14. The apparatus according to claim 13, wherein said combined motion score is read from a lookup table indexed by said motion score and said additional motion score.

15. The apparatus according to claim 11, wherein (i) said circuit is further configured to compute an additional motion score by motion detection between said target area and said second area and (ii) said generation of said filtered area is further based on said additional motion score.

16. The apparatus according to claim 15, wherein (i) said circuit is further configured to compute a combined motion score as a combination of said motion score and another motion score based on a third area in another one of said reference pictures and (ii) said other reference picture is non-adjacent to said target picture.

17. The apparatus according to claim 11, wherein (i) said circuit is further configured to (a) generate a maximum motion score by selecting a maximum value between said motion score and another motion score, (b) said other motion score is independent of said target picture and (c) transform said maximum motion score to generate a combined motion score and (ii) said temporal filter strength is based on said combined motion score and said blending function.

18. The apparatus according to claim 11, wherein (i) said circuit is further configured to (a) determine a maximum score among said motion score and one or more additional motion scores computed between two or more co-located areas in two or more of said reference pictures and (b) combine said maximum score and said motion score to generate a combined motion score and (ii) said temporal filter strength is based on said combined motion score and said blending function.

19. The apparatus according to claim 11, wherein said interface and said circuit are part of a digital camera.

20. The apparatus according to claim 11, wherein said non-adjacent reference picture is motion compensated prior to said motion detection with said target area.

* * * * *